US012564483B2

(12) United States Patent　　　　(10) Patent No.: US 12,564,483 B2
Kitahara　　　　　　　　　　　　　　　(45) Date of Patent: Mar. 3, 2026

(54) DENTAL FLOSS HOLDER

(71) Applicant: Koujirou Kitahara, Fukuoka (JP)

(72) Inventor: Koujirou Kitahara, Fukuoka (JP)

( * ) Notice: Subject to any disclaimer, the term of this patent is extended or adjusted under 35 U.S.C. 154(b) by 316 days.

(21) Appl. No.: 18/039,276

(22) PCT Filed: Dec. 7, 2021

(86) PCT No.: PCT/JP2021/045013
　　§ 371 (c)(1),
　　(2) Date: May 29, 2023

(87) PCT Pub. No.: WO2022/124318
　　PCT Pub. Date: Jun. 16, 2022

(65) Prior Publication Data
　　US 2024/0050207 A1　　Feb. 15, 2024

(30) Foreign Application Priority Data

Dec. 10, 2020　(JP) ................................ 2020-204900

(51) Int. Cl.
　　*A61C 15/04*　　　　(2006.01)
(52) U.S. Cl.
　　CPC .......... *A61C 15/046* (2013.01); *A61C 15/045* (2013.01)
(58) Field of Classification Search
　　CPC ...... A61C 15/04; A61C 15/045; A61C 15/046
　　See application file for complete search history.

(56) References Cited

U.S. PATENT DOCUMENTS

| | | | |
|---|---|---|---|
| 1,417,518 A | * | 5/1922 | Henerlau ............. A61C 15/046 |
| | | | 132/324 |
| 4,342,324 A | * | 8/1982 | Sanderson ........... A61C 15/046 |
| | | | 132/324 |

(Continued)

FOREIGN PATENT DOCUMENTS

| | | |
|---|---|---|
| JP | S6221315 | 2/1987 |
| JP | H0535112 | 5/1993 |

(Continued)

OTHER PUBLICATIONS

"International Search Report (Form PCT/ISA/210) of PCT/JP2021/045013", mailed on Jan. 18, 2022, with English translation thereof, pp. 1-4.

*Primary Examiner* — Tatiana L Nobrega
(74) *Attorney, Agent, or Firm* — JCIPRNET

(57) ABSTRACT

Provided is a dental floss holder in which the type of floss thread and the degree of tension thereof can be easily changed and the workability of the user is good. The dental floss holder includes a rod-like handle portion for a user to grip, a head portion to which a dental floss is locked, and a constricted portion connecting a distal end of the handle portion and the head portion, the constricted portion formed so as to be reduced with respect to a connection part of the handle portion and the head portion adjacent to the constricted portion in a width direction and/or a thickness direction of the connection part. A recessed portion extending in a thickness direction of the head portion is formed on a distal end surface of the head portion, and a notch portion is formed in a longitudinal direction from the recessed portion, and the notch portion extends to the constricted portion.

5 Claims, 7 Drawing Sheets

(56) References Cited

U.S. PATENT DOCUMENTS

| | | | | |
|---|---|---|---|---|
| 5,573,022 A | * | 11/1996 | Winters | A61C 15/046 |
| | | | | 132/325 |
| 5,680,875 A | * | 10/1997 | Winters | A61C 15/043 |
| | | | | 132/324 |
| 5,765,577 A | * | 6/1998 | Wei | A61C 15/043 |
| | | | | 132/321 |
| 5,842,490 A | * | 12/1998 | Jensen | A46B 15/0071 |
| | | | | 132/309 |
| 7,234,473 B1 | * | 6/2007 | Winters | A46B 15/0073 |
| | | | | 132/309 |
| 2014/0338695 A1 | * | 11/2014 | Chang | A46B 15/0071 |
| | | | | 132/309 |
| 2016/0166364 A1 | * | 6/2016 | Goldston | A61C 15/046 |
| | | | | 132/327 |
| 2016/0324607 A1 | * | 11/2016 | Kaye | A61C 15/046 |
| 2017/0281322 A1 | * | 10/2017 | Pinto | A61C 15/04 |

FOREIGN PATENT DOCUMENTS

| JP | H0658923 | 8/1994 | | |
|---|---|---|---|---|
| JP | H0788122 | 4/1995 | | |
| JP | 3089827 | 11/2002 | | |
| JP | 3092091 | 2/2003 | | |
| JP | 3104916 | 10/2004 | | |
| JP | 3092091 U | * | 2/2023 | A61C 15/04 |

* cited by examiner (a)

DENTAL FLOSS HOLDER

CROSS-REFERENCE TO RELATED APPLICATION

This application is a 371 application of the International PCT application serial no. PCT/JP2021/045013, filed on Dec. 7, 2021, which claims the priority benefits of Japan Patent Application No. 2020-204900, filed on Dec. 10, 2020. Each of the entirety of the above-mentioned patent applications is hereby incorporated by reference herein and made a part of this specification.

BACKGROUND

Field of the Invention

The present invention relates to a dental floss holder in which a floss thread can be freely attached and detached.

Background Art

In order to prevent tooth decay and periodontal disease, it has conventionally been known in oral cleaning to use a toothbrush for cleaning of the tooth surface, a dental floss or an interdental brush for cleaning between the teeth, and a tongue-dedicated soft rubbery cleaning tool for the tongue surface. Such oral care is important in terms of preventive medicine, but in many cases, the oral care performed each time by each person is entirely focused on cleaning the tooth surface with the toothbrush. Despite the fact that the dental floss and the interdental brush are effective in the prevention of tooth decay and periodontal disease, their widespread use tends to be hindered by circumstances where, for example, the use of the dental floss is difficult and troublesome.

Here, currently commercially available dental floss is mainly of a type that is used by being wound around one's own fingers, a disposable type in which a floss thread and a floss holder are integrally formed, etc.

Patent Document 1 discloses a dental floss holder that can be adjusted according to the length of the teeth so as not to damage the gums and clean between the teeth. In the dental floss holder, grooves are provided on each top of a bifurcated portion at a distal end of a handle and on an outer surface of the bifurcated portion, and a floss thread is wound around the grooves on the outer surface of the bifurcated portion. Then, the floss thread comes into contact with the distal end of the tooth, which prevents a situation in which the gums are damaged by the floss thread for interdental cleaning stretched between the tops of the bifurcated portion. Patent Document 2 discloses a dental floss pick for interdental cleaning configured so that a thread can be replaced. In this art, a replacement thread is tightly wound around a notch portion of a main body, thereby allowing for the interdental cleaning without slack in the thread, and the thread of the dental floss pick for interdental cleaning is made replaceable, so that the dental floss pick can be used repeatedly.

CITATION LIST

Patent Documents

Patent Document 1: Japanese Published Unexamined Utility Model Application No. H05-35112
Patent Document 2: Japanese Registered Utility Model No. 3089827

SUMMARY OF THE INVENTION

Technical Problems

The disposable dental floss in which the floss thread and the floss holder are integrally formed is not economical considering that it is discarded after each use in oral cleaning. Further, during interdental cleaning, the tension of the floss thread attached to the floss holder cannot be finely adjusted, so that forcibly inserting the floss thread into the interdental portion may lead to breakage or damage the gums. Here, according to the art described in Patent Document 1, the floss thread wound around the grooves on the outer surface of the bifurcated portion prevents a situation in which the gums are damaged, but the tension of the floss thread cannot be finely adjusted during interdental cleaning. Further, according to the art described in Patent Document 2, although the floss thread is configured to be replaceable, it is still not possible to finely adjust the tension of the floss thread during interdental cleaning, and the workability of the user in interdental cleaning may be impaired.

On the other hand, the dental floss of the type that is used by being wound around one's own fingers allows for easily changing the type of floss thread for interdental cleaning and the degree of tension thereof, but this is not hygienic because fingers need to be put into the oral cavity. Further, finger pain due to the winding of the floss thread around one's own fingers and taking time to become proficient may be problems. Furthermore, in such a type of dental floss, the user needs to open the mouth wide for interdental cleaning over a relatively long period of time, so that jaw fatigue may be a problem.

An object of the present invention is to provide a dental floss holder in which the type of floss thread and the degree of tension thereof can be easily changed and the workability of the user is good.

Solution to Problems

In order to achieve the foregoing object, a dental floss holder of the present invention includes a rod-like handle portion for a user to grip, a head portion to which a dental floss is locked, and a constricted portion connecting a distal end of the handle portion and the head portion, the constricted portion formed so as to be reduced with respect to a connection part of the handle portion and the head portion adjacent to the constricted portion in a width direction and/or a thickness direction of the connection part. In this dental floss holder, a recessed portion extending in a thickness direction of the head portion is formed on a distal end surface of the head portion, and a notch portion is formed in a longitudinal direction from the recessed portion, and the notch portion extends to the constricted portion.

Here, by the constricted portion connecting the distal end of the handle portion and the head portion, the constricted portion formed so as to be reduced with respect to the connection part of the handle portion and the head portion adjacent to the constricted portion in the width direction and/or the thickness direction of the connection part, the recessed portion formed on the distal end surface of the head portion so as to extend in the thickness direction of the head portion, and the notch portion formed in the longitudinal direction from the recessed portion, one end portion of the dental floss can be locked to the head portion and the other end portion of the dental floss can be a free end.

That is, for example, the dental floss can be locked to the head portion by passing the dental floss through the notch portion, winding the dental floss passed through the notch portion around the constricted portion, and further passing the dental floss through the notch portion.

Further, the constricted portion allows the dental floss once passed through the notch portion to be wound around the constricted portion, which serves as a fixed position.

Further, the dental floss wound so as to be concentrated at the constricted portion tightens the notch portion in the constricted portion, and the dental floss passed through the notch portion can be firmly fixed to the dental floss holder.

At this time, the tensile force of the wound dental floss is concentrated on the constricted portion.

As a result, even if the user is a child or an elderly person, the dental floss can be easily fixed to the dental floss holder of the present invention.

Further, the dental floss can be firmly fixed to the dental floss holder, so that the workability of the user when cleaning between the teeth using the dental floss holder is improved.

Further, one end portion of the dental floss can be locked to the head portion and the other end portion of the dental floss can be a free end, so that the user can pinch the other end portion to clean between the teeth and is not required to use the dental floss by winding it around his/her own fingers, and as a result does not cause pain to the user's fingers.

Further, the user can clean between the teeth by pinching the other end portion of the dental floss, so that the user can clean between the teeth while easily changing the degree of tension of the dental floss.

Further, although it took time to become proficient with the interdental cleaning of the type that the dental floss is wound around the user's own fingers, the use of the dental floss holder of the present invention eliminates the need for the dental floss to be wound around the user's own fingers for use, so that it does not take time to become proficient with the interdental cleaning.

As a result, there is no need to keep the mouth wide open for interdental cleaning over a relatively long period of time, and the jaw of the user is less likely to become fatigued.

The interdental cleaning performed by locking one end portion of the dental floss to the head portion and pinching the other end portion as in the interdental cleaning using the dental floss holder of the present invention is hygienic because the interdental cleaning can be performed by putting the head portion of the dental floss holder of the present invention into the oral cavity and pulling the other end portion, which is the free end, of the dental floss with fingers from the outside of the oral cavity and there is no need to put fingers into the oral cavity.

Further, in the dental floss holder of the present invention, the head portion can have a stopper portion.

Here, the stopper portion is provided so as to partially cover the notch portion.

Further, the stopper portion prevents the dental floss from entering the notch portion on the constricted portion side further than the stopper portion.

With such a stopper portion, one end portion of the dental floss can be easily locked to the constricted portion.

Further, the notch portion may have an edge portion folded back on the recessed portion side at a predetermined acute angle on its way extending from the recessed portion toward the constricted portion. At this time, the notch portion may be formed to have a predetermined angle with respect to an imaginary line extending in a longitudinal direction from the recessed portion in a section from the recessed portion to the edge portion.

Further, in the dental floss holder of the present invention, the handle portion may be provided with a thread winding portion configured to allow the dental floss to be wound therearound in the above configuration.

Advantageous Effects of Invention

According to the present invention, there can be provided a dental floss holder in which the type of floss thread and the degree of tension thereof can be easily changed and the workability of the user is good.

BRIEF DESCRIPTION OF THE DRAWINGS

FIG. 4 is a diagram for explaining a procedure for locking a dental floss to the dental floss holder.

DESCRIPTION OF THE EMBODIMENTS

Hereinafter, embodiments of the present invention will be described based on the drawings. Configurations of the following embodiments are examples, and the present invention is not limited to the configurations of the embodiments.

First Embodiment

Figure 1:
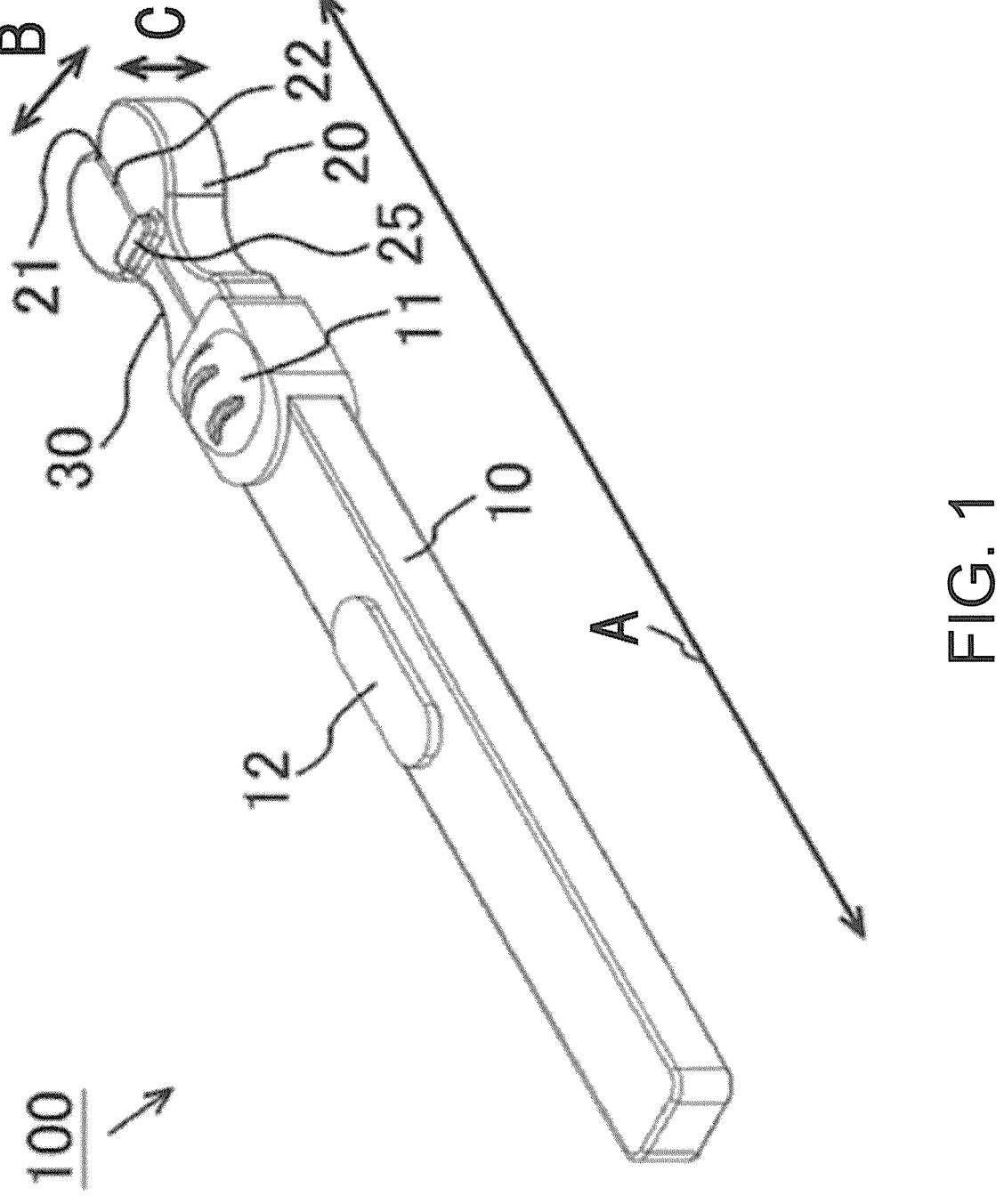
FIG. 1 is a diagram showing a schematic configuration of a dental floss holder in a first embodiment.

An overview of a dental floss holder in a first embodiment will be described with reference to FIG. 1. FIG. 1 is a diagram showing a schematic configuration of the dental floss holder in the present embodiment. The dental floss holder 100 according to the present embodiment includes a rod-like handle portion 10 for a user to grip, a head portion 20 to which a dental floss 40 is locked, and a constricted portion 30 connecting a distal end of the handle portion 10 and the head portion 20.

Here, the handle portion 10, the head portion 20, and the constricted portion 30 are integrally formed in the dental floss holder 100 of the present embodiment. They can be formed of a material such as synthetic resin or silicon and the surface thereof may be subjected to an antimicrobial treatment.

The handle portion 10 is a portion that is gripped by a user when the user cleans between the teeth using the dental floss holder 100 and the dental floss 40 locked to the holder. In the present embodiment, a finger support portion 11 is provided on the handle portion 10.

The finger support portion 11 is designed so that the user can easily hold down one end portion of the dental floss 40 with a finger in a procedure for locking the dental floss 40 to the dental floss holder 100 described later, and is formed in a rounded protruding shape.

Further, the handle portion 10 may be provided with a thread winding portion 12 described later.

The head portion 20 is a portion to which the dental floss 40 is locked in the dental floss holder 100, and a recessed portion 21 extending in a thickness direction C of the head portion 20 is formed on a distal end surface of the head portion 20.

In the present embodiment, as shown in FIG. 1, the head portion 20 is formed in a heart shape by forming the recessed portion 21 at the top of a substantially circular shape. Further, a notch portion 22 is formed in the head portion 20 in a longitudinal direction A from the recessed portion 21.

The constricted portion 30 is formed so as to be reduced with respect to a connection part of the handle portion 10 and the head portion 20 adjacent to the constricted portion 30 in a width direction B and/or a thickness direction C of the connection part. In the present embodiment, as shown in FIG. 1, the constricted portion 30 is formed to be reduced in the width direction B.

However, with no intention to be limited thereto, the constricted portion 30 may be formed so as to be reduced in the thickness direction C or the constricted portion 30 may be formed so as to be reduced in the width direction B and the thickness direction C as long as the constricted portion 30 has a shape that allows the dental floss 40 passed through the notch portion 22 of the head portion 20 to be wound around a fixed position, which will be described later.

The user then can lock the dental floss 40 to the head portion 20 of the dental floss holder 100 by passing the dental floss 40 through the notch portion 22 formed in the head portion 20 of the dental floss holder 100, winding the dental floss 40 once passed through the notch portion 22 around the constricted portion 30 several times, and further passing the dental floss 40 through the notch portion 22.

Figure 2:
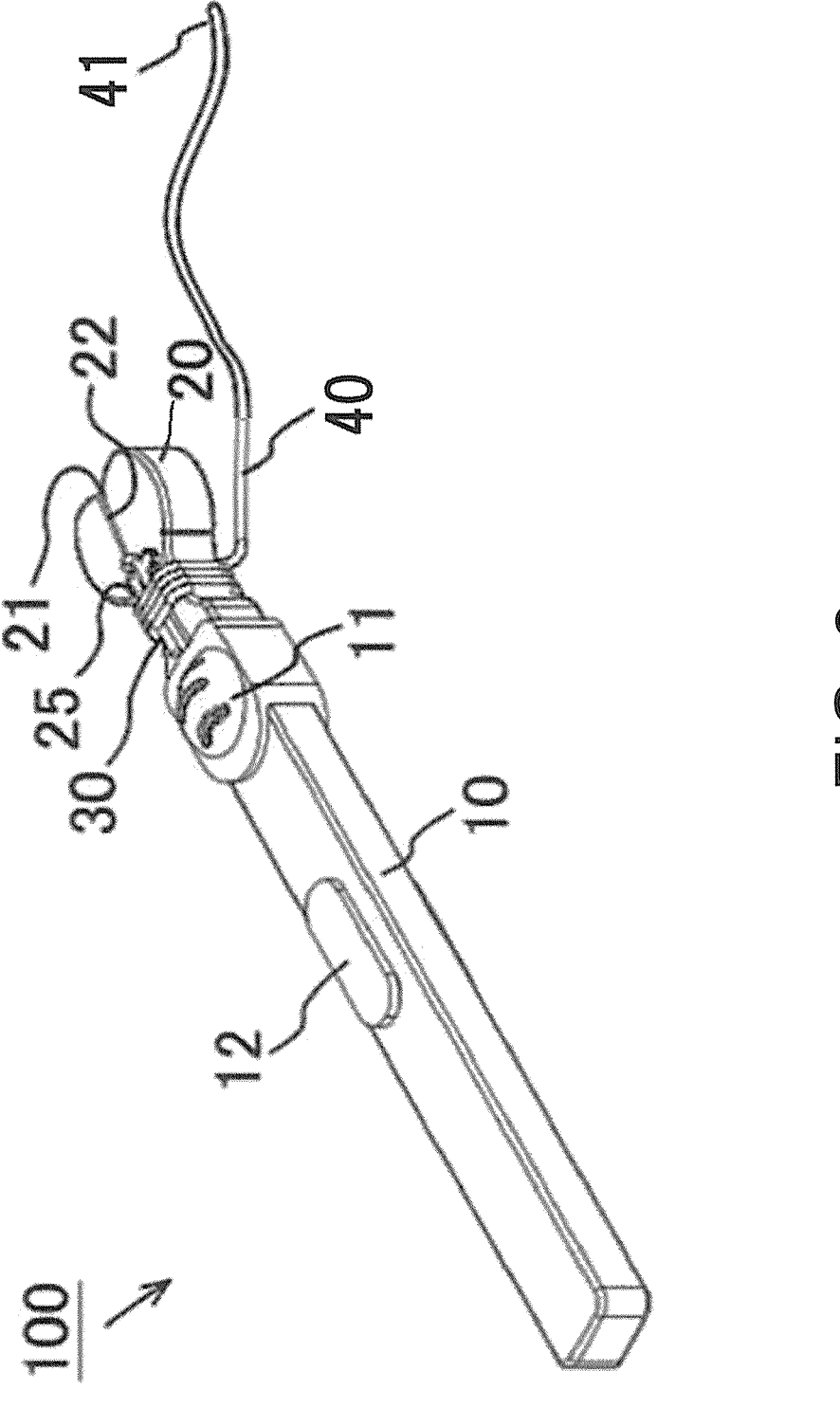
FIG. 2 is a diagram for explaining a use state of the dental floss holder in the first embodiment.

Here, FIG. 2 is a diagram for explaining a use state of the dental floss holder 100 in the present embodiment.

With the dental floss 40 locked to the dental floss holder 100 as described above, the user can clean between the teeth by pinching one end portion, which is a free end 41, of the dental floss 40 with fingers to apply tensile force to the dental floss 40. A procedure for locking the dental floss 40 to the dental floss holder 100 as described above will be described in detail in FIG. 4 described later.

In such interdental cleaning using the dental floss holder 100 of the present embodiment, for example, the head portion 20 of the dental floss holder 100 is put into the oral cavity, the free end 41 of the dental floss 40 is pulled by fingers from the outside of the oral cavity, and the interdental cleaning can be performed.

In this case, there is no need to put fingers into the oral cavity, which is hygienic (more hygienic when the surface of the dental floss holder 100 is subjected to an antimicrobial treatment).

Furthermore, the head portion 20 is heart-shaped, that is, formed to be rounded in the dental floss holder 100 of the present embodiment, so that a situation in which the oral cavity is damaged by the head portion 20 is prevented as much as possible even if the dental floss holder 100 is put into the oral cavity.

Furthermore, with such a shape of the head portion 20, even if the user is a child or an elderly person, the dental floss 40 can be easily introduced into the notch portion 22, and also even in a situation where the user's visibility is poor (for example, use in a bathroom), the dental floss 40 can be easily introduced into the notch portion 22.

Unlike the dental floss 40 of the conventional type that is used by being wound around one's own fingers, the user can lock one end portion of the dental floss 40 to the dental floss holder 100 and pinch the other end portion to clean between the teeth. That is, since there is no need to wind the dental floss 40 around one's own fingers for use, the situation of causing pain to the user's fingers is prevented as much as possible.

Further, since there is no need to open the mouth wide for interdental cleaning over a relatively long period of time, the situation of causing jaw fatigue to the user is prevented as much as possible. In such interdental cleaning, it is a matter of course that the degree of tension of the dental floss 40 can be easily changed.

With the dental floss holder of the present invention, the dental floss 40 is passed through the notch portion 22 formed in the head portion 20, and the dental floss 40 once passed through the notch portion 22 is wound around the constricted portion 30 several times, and the dental floss 40 is further passed through the notch portion 22, whereby the dental floss 40 is locked to the head portion 20 of the dental floss holder 100.

By providing such a constricted portion 30, the dental floss 40 once passed through the notch portion 22 can be wound around a fixed position.

According to this, the notch portion 22 in the constricted portion 30 is tightened by the dental floss 40 wound so as to be concentrated at the constricted portion 30, and the dental floss 40 passed through the notch portion 22 is firmly fixed to the dental floss holder 100.

At this time, the tensile force of the wound dental floss 40 is concentrated on the constricted portion 30. Therefore, the dental floss 40 is stably fixed to the dental floss holder 100, and the workability of the user when cleaning between the teeth using the dental floss holder 100 is improved.

Then, even if the user is a child or an elderly person, the dental floss 40 can be easily fixed to the dental floss holder 100.

Here, a stopper portion 25 is provided on the head portion 20 in the dental floss holder 100 of the present embodiment. This will be described based on FIG. 3.

Figure 3:
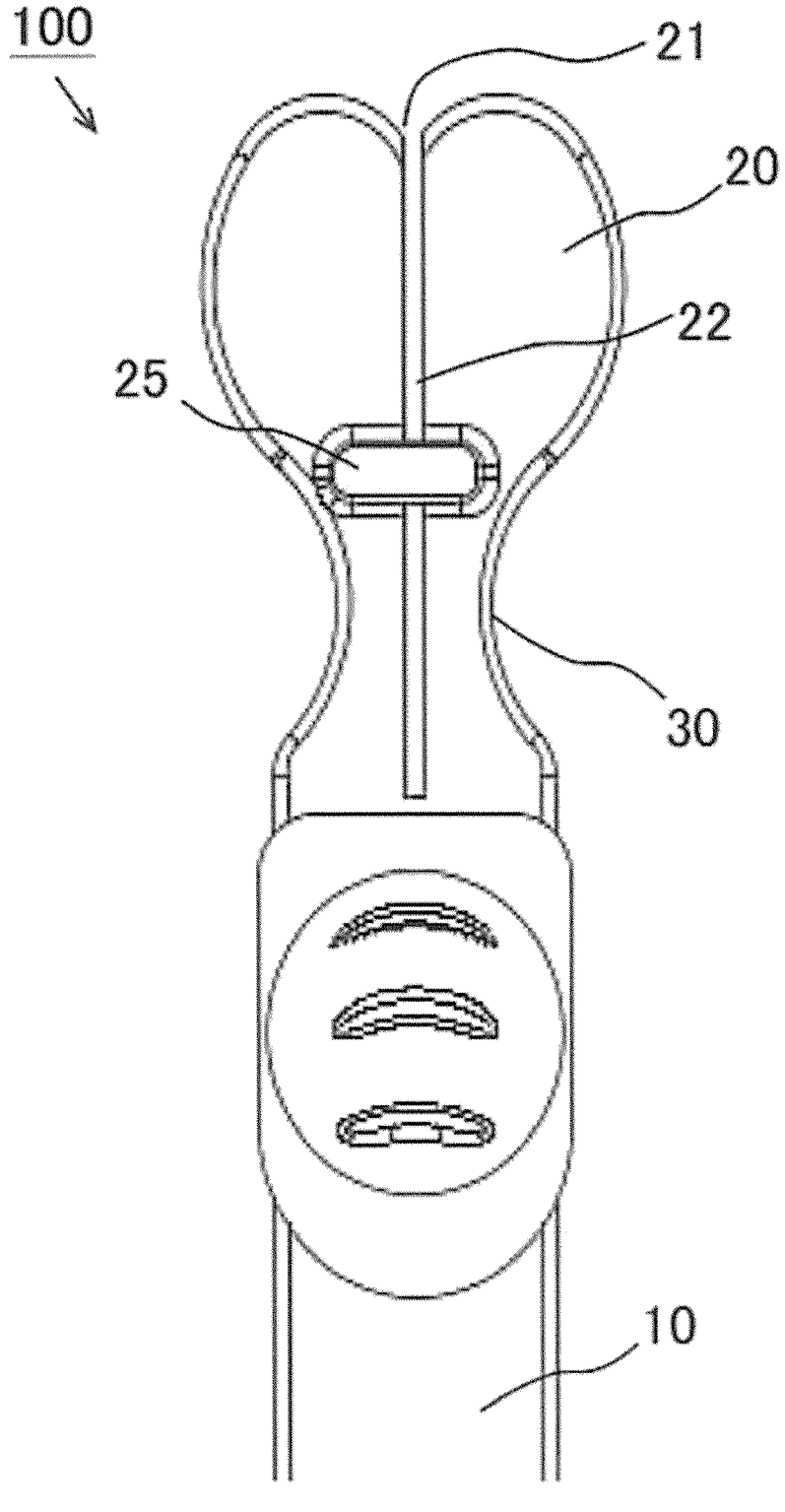
FIG. 3 is a diagram for explaining details of a stopper portion in the dental floss holder in the first embodiment.

FIG. 3 is a diagram for explaining details of the stopper portion 25 in the dental floss holder 100 in the present embodiment.

As shown in FIG. 3, the stopper portion 25 is provided so as to partially cover the notch portion 22. The stopper portion 25 prevents the dental floss 40 from entering the notch portion 22 on the constricted portion 30 side further than the stopper portion 25. Specifically, when the user passes the dental floss 40 in the longitudinal direction A along the notch portion 22 from the recessed portion 21 side, the entering of the dental floss 40 into the notch portion 22 is prevented by the stopper portion 25, and the user can no longer pass the dental floss 40 in the longitudinal direction A.

According to this, the dental floss 40 can be fixed to the dental floss holder 100 at a position suitable for interdental cleaning (a position where the head portion 20 does not interfere during interdental cleaning), and thus the workability of the user is improved.

In particular, even if the user is a child or an elderly person, the use of the dental floss holder 100 provided with such a stopper portion 25 allows for interdental cleaning with good workability. Such a stopper portion 25 is formed, for example, at a position 5 to 7 mm from the recessed portion 21.

Further, such a stopper portion 25 facilitates locking one end portion of the dental floss 40 to the constricted portion 30.

That is, when one end portion of the dental floss 40 is locked to the constricted portion 30, for example, the other part of the dental floss 40 is wound around a place where a part of a predetermined length from one end portion of the dental floss 40 and the constricted portion 30 are overlapped. The other part of the dental floss 40 only needs to be wound about the notch portion 22 with the part of a predetermined length extended in the same direction as the longitudinal direction A by the stopper portion 25. Thus, the other part of the dental floss 40 is easily wound around the place where the part of a predetermined length and the constricted portion 30 are overlapped.

Next, a procedure for locking the dental floss 40 to the dental floss holder 100 will be described.

Figure 4:
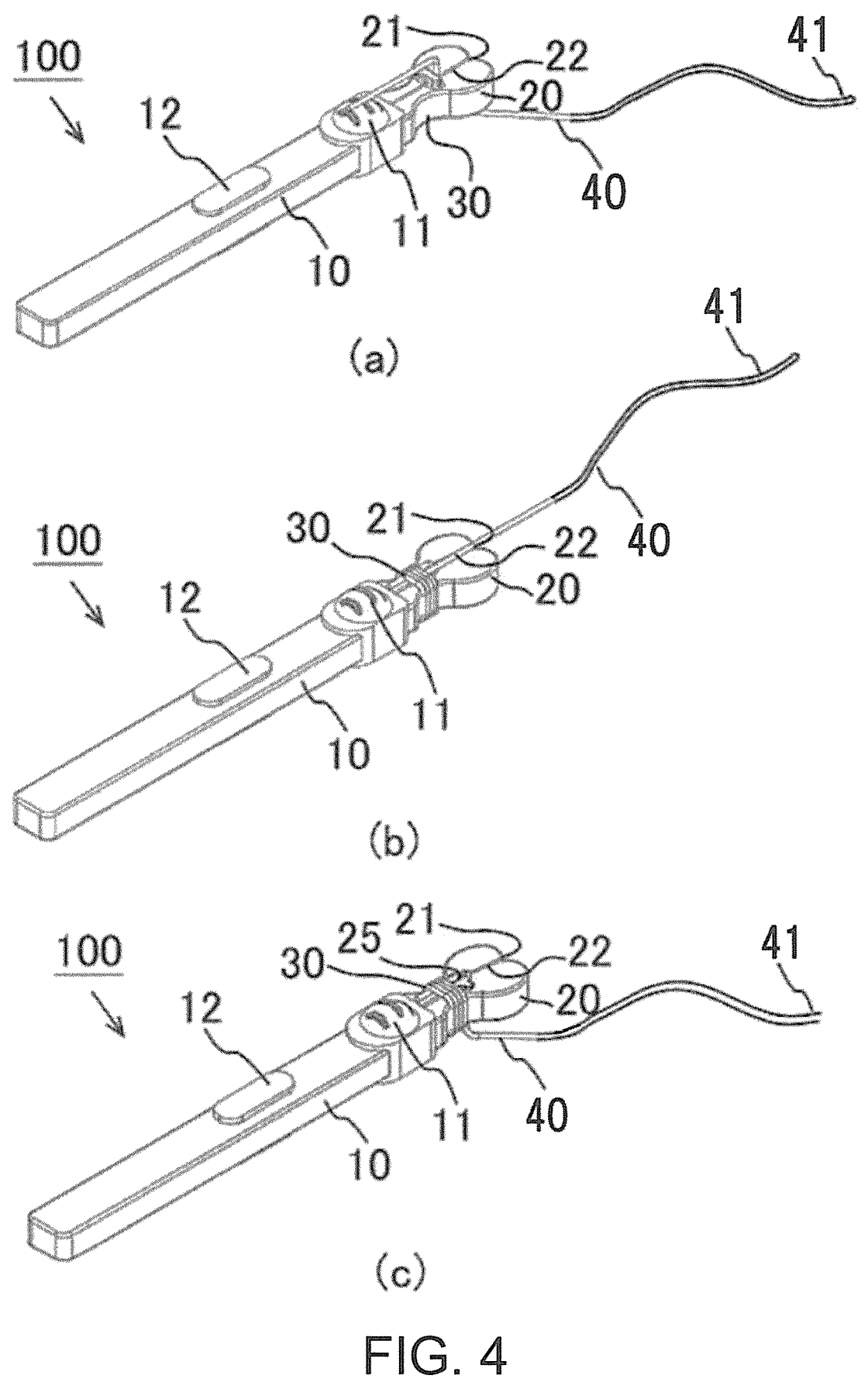

FIG. 4 is a diagram for explaining the procedure for locking the dental floss 40 to the dental floss holder 100.

First, as shown in FIG. 4(*a*), the dental floss 40 is passed through the notch portion 22 formed in the head portion 20 of the dental floss holder 100. Here, when the dental floss 40 is passed through the notch portion 22 from the recessed portion 21 side by the user, the formation of the recessed portion 21 facilitates the introduction of the dental floss 40 into the notch portion 22, as described above. At this time, the user can hold down one end portion of the dental floss 40 using the finger support portion 11.

As shown in FIG. 4(*b*), then, the dental floss 40 once passed through the notch portion 22 is wound around the constricted portion 30 several times.

As shown in FIG. 4(*c*), then, the dental floss 40 wound around the constricted portion 30 several times is passed through the notch portion 22 again, whereby the dental floss 40 is locked to the head portion 20 of the dental floss holder 100.

According to this, as described above, the notch portion 22 in the constricted portion 30 is tightened by the dental floss 40 wound so as to be concentrated at the constricted portion 30, and the dental floss 40 passed through the notch portion 22 is firmly fixed to the dental floss holder 100.

With the dental floss holder of the present invention, the dental floss 40 can be easily replaced. This will be described based on FIG. 5.

Figure 5:
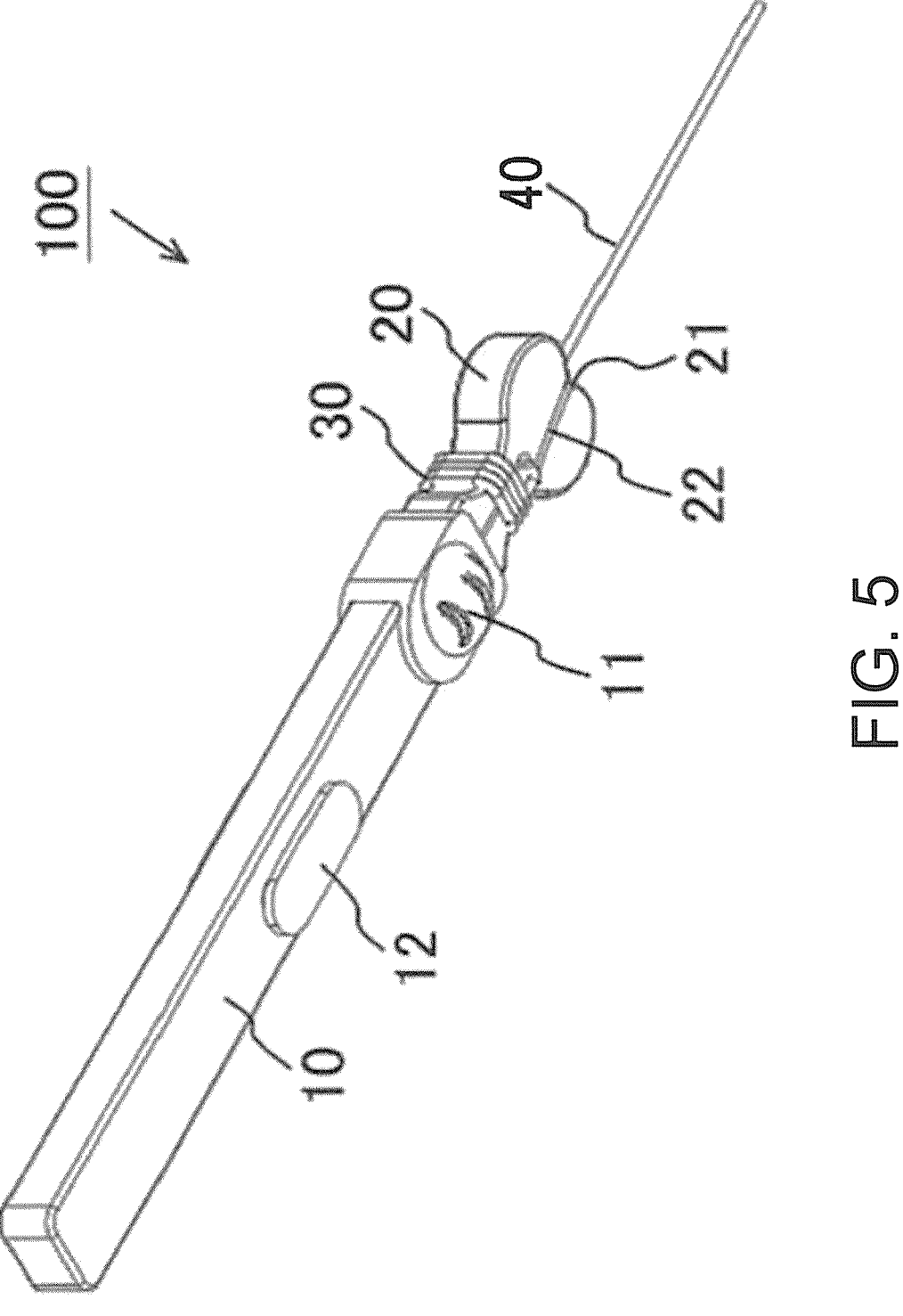
FIG. 5 is a diagram for explaining removal of the dental floss from the dental floss holder.

FIG. 5 is a diagram for explaining removal of the dental floss 40 from the dental floss holder 100.

In the dental floss holder 100 of the present embodiment, when the free end 41 of the dental floss 40 is pulled in a direction substantially perpendicular to the longitudinal direction A, the dental floss 40 is firmly fixed to the dental floss holder 100. On the contrary, as shown in FIG. 5, when the free end 41 of the dental floss 40 is pulled in the longitudinal direction A, the restraint on the dental floss 40 by the notch portion 22 is released, so that the dental floss 40 can be removed from the dental floss holder 100 very easily.

According to this, the type of dental floss 40 can be changed with good workability, and only the dental floss 40 needs to be replaced each time it is used, which is hygienic and economical.

The handle portion 10 may be provided with a thread winding portion 12 configured to allow the dental floss 40 to be wound therearound. Here, FIG. 6 is a diagram for explaining storage of the free end 41 of the dental floss 40 locked to the dental floss holder 100.

Figure 6:
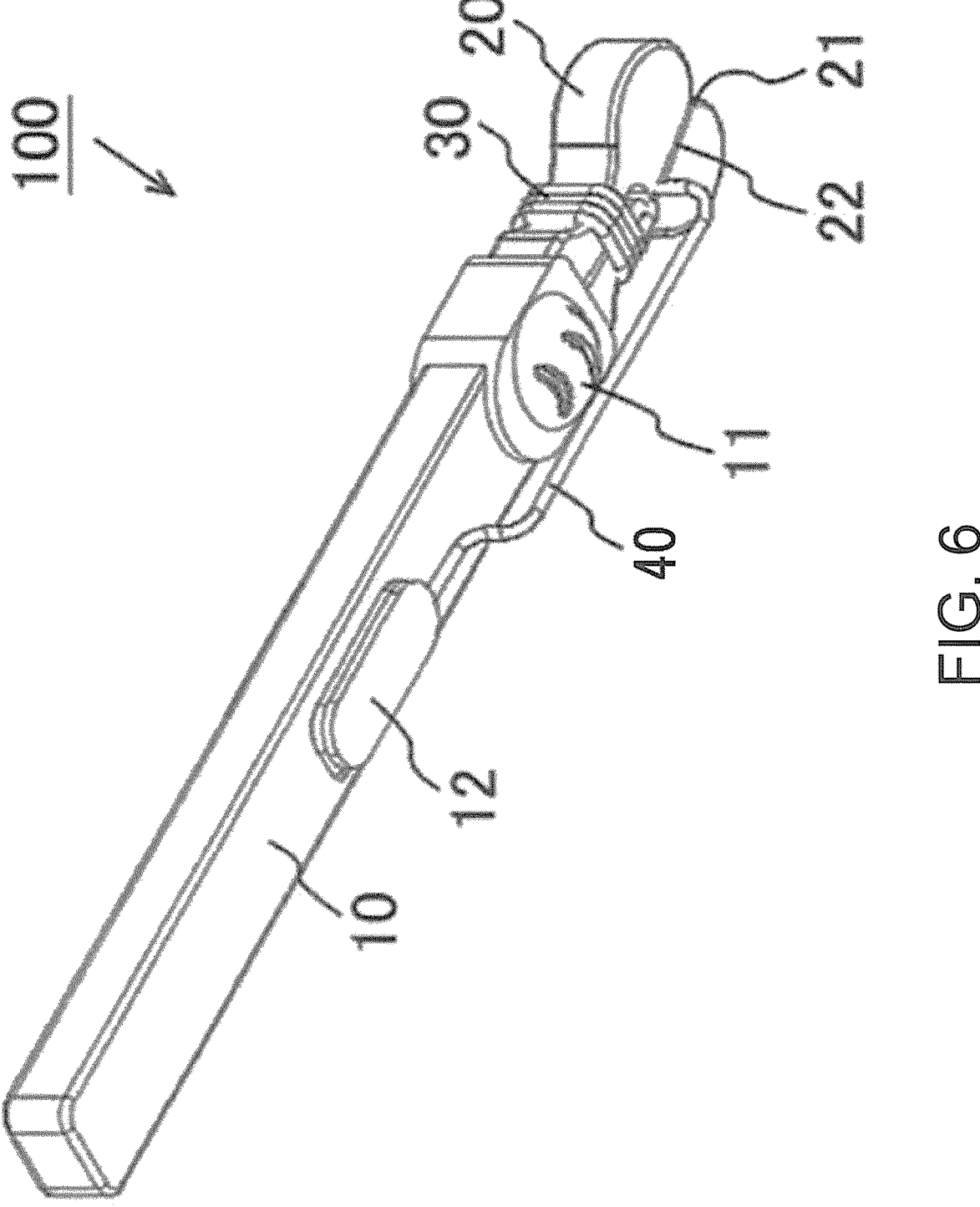
FIG. 6 is a diagram for explaining storage of a free end of the dental floss locked to the dental floss holder.

In the present embodiment, as shown in FIG. 6, the dental floss 40 may be stored by winding the free end 41 of the dental floss 40 around the thread winding portion 12.

According to this, the free end 41 of the dental floss 40 is stored in the thread winding portion 12 and the dental floss 40 can be kept hygienic in such a case that the dental floss

40 is attached to the dental floss holder 100 in advance in preparation for the next use, for example.

With the dental floss holder 100 described above, the type of floss thread and the degree of tension thereof can be easily changed, and the workability of the user can be improved.

Second Embodiment

In a dental floss holder 100 of a second embodiment, a notch portion 22 has an edge portion 23 folded back on a recessed portion 21 side at a predetermined acute angle on its way extending from the recessed portion 21 toward a constricted portion 30.

In such a configuration, the notch portion 22 may be formed to have a predetermined angle with respect to an imaginary line extending in a longitudinal direction A from the recessed portion 21 in a section from the recessed portion 21 to the edge portion 23. This will be described based on FIG. 7.

Figure 7:
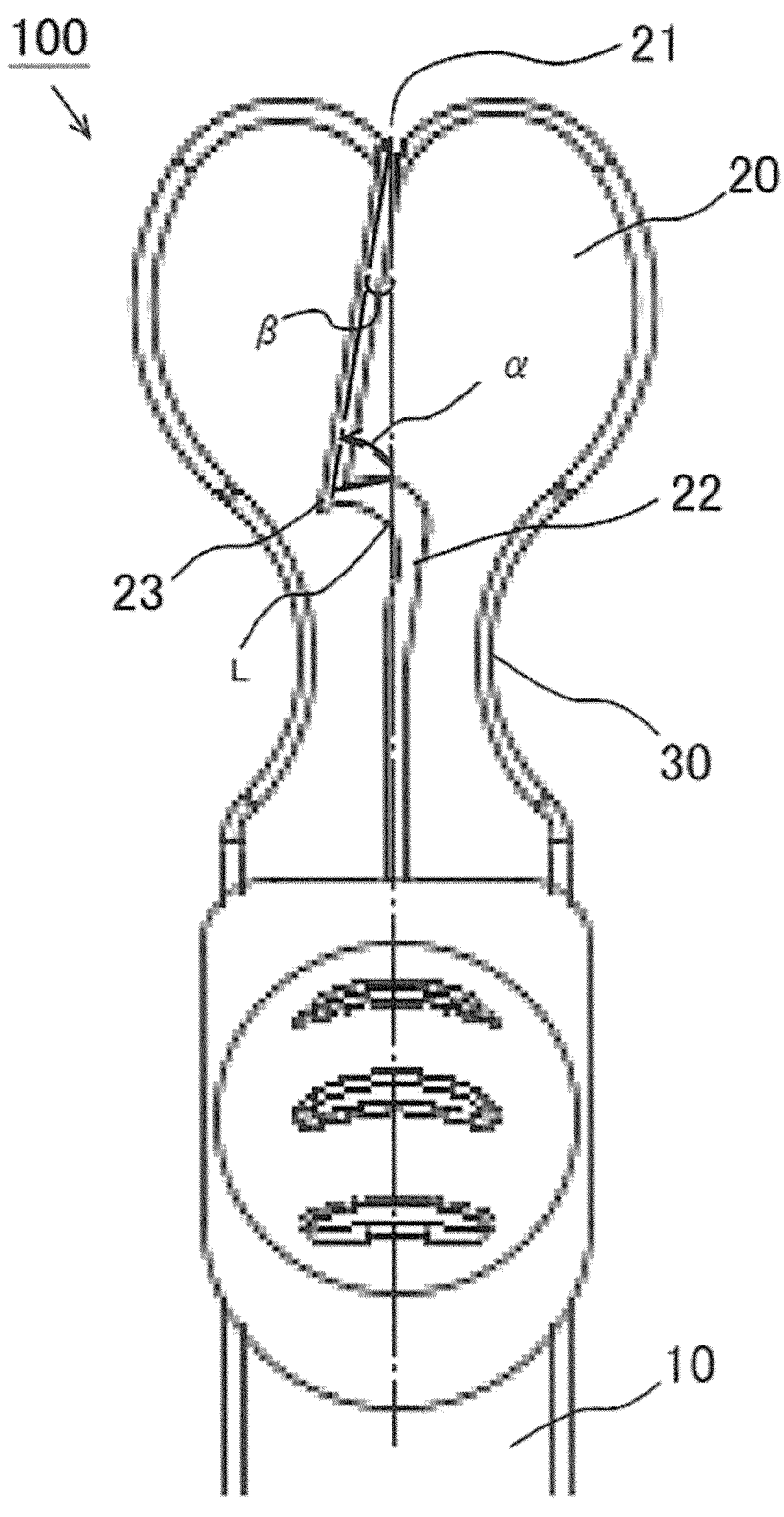
FIG. 7 is a diagram for explaining details of a notch portion in the dental floss holder in a second embodiment.

FIG. 7 is a diagram for explaining details of the notch portion 22 in the dental floss holder 100 in the present embodiment.

As shown in FIG. 7, the edge portion 23 is folded back on the recessed portion 21 side at an acute angle α with respect to the notch portion 22 extending from the recessed portion 21. Then, when a dental floss is passed through the notch portion 22 from the recessed portion 21 side by the user, the dental floss 40 is stopped by the edge portion 23.

Specifically, when the user passes the dental floss 40 in the longitudinal direction A along the notch portion 22 from the recessed portion 21 side, it becomes difficult for the user to pass the dental floss 40 in the longitudinal direction A any further since the notch portion 22 is folded back on the recessed portion 21 side by the edge portion 23.

According to this, the dental floss 40 can be fixed to the dental floss holder 100 at a position suitable for interdental cleaning, and thus, the workability of the user is improved. Such an edge portion 23 is formed, for example, at a position 5 to 7 mm from the recessed portion 21.

Further, as shown in FIG. 7, the notch portion 22 has an angle β with respect to an imaginary line L extending in the longitudinal direction A from the recessed portion 21 in a section from the recessed portion 21 to the edge portion 23.

According to this, it becomes easier to block the dental floss 40 passed through the notch portion 22 by the edge portion 23.

Also with the dental floss holder 100 described above, the type of floss thread and the degree of tension thereof can be easily changed, and the workability of the user can be improved.

<Other Modifications>

The above embodiments are merely examples, and the present invention can be modified and implemented as appropriate without departing from the gist thereof. For example, the dental floss holder 100 described in the above embodiments may be formed in a size similar to that of a toothbrush. According to this, the dental floss holder 100 can be placed and stored in a well-known toothbrush case.

According to this, the dental floss 40 can be attached to the dental floss holder 100 in advance in preparation for the next use, and further, the dental floss holder 100 can be placed into a case and carried. Then, interdental cleaning using the dental floss holder 100 can be performed after a meal even when the user is away from home.

DESCRIPTION OF REFERENCE NUMERALS

10 Handle portion
20 Head portion

21 Recessed portion
22 Notch portion
30 Constricted portion
40 Dental floss
41 Free end
100 Dental floss holder
A Longitudinal direction
B Width direction
C Thickness direction
L Imaginary line
What is claimed is:

1. A dental floss holder comprising:

a rod-like handle portion for a user to grip;

a head portion to which a dental floss is locked, the head portion having convexly curved right and left sides which respectively converge with convexly curved right and left distal surfaces; and a constricted portion extending longitudinally from a distal end of the handle portion, where a distal end of the constricted portion is connected to a proximal end of the head portion, the constricted portion having opposing concavities on right and left sides thereof so as to be reduced in width with respect to the distal end of the handle portion and the convexly curved right and left sides of the head portion adjacent to the constricted portion; wherein a recessed portion extending in a thickness direction, between upper and lower sides of the head portion and formed on adjacent portions of the right and left distal end surfaces of the head portion, an elongated notch is formed in a longitudinal direction extending from the recessed portion through the head portion and the constricted portion, where the elongated notch extends from the upper and lower sides of the head portion and upper and lower sides of the constricted portion such that the elongated notch bisects the constricted portion and the head portion in half, and a stopper portion disposed between the recessed portion and the constricted portion, and the stopper portion forms a bridge between the halves of the upper surface of the head portion and extends across a segment of the elongated notch so as to partially cover the elongated notch, wherein a proximal section of the elongated notch exists in the constricted portion between the stopper portion and a terminal proximal end of the elongated notch, the stopper portion is configured to prevent the dental floss from entering the proximal section of the elongated notch.

2. The dental floss holder according to claim 1, wherein the elongated notch has an edge portion that is folded back toward a side of the recessed portion at a predetermined acute angle on a way of the elongated notch extending from the recessed portion toward the constricted portion.

3. The dental floss holder according to claim 2, wherein the elongated notch is formed to have a predetermined angle with respect to an imaginary line extending in the longitudinal direction from the recessed portion in a section form the recessed portion to the edge portion.

4. The dental floss holder according to claim 1, wherein the handle portion is provided with a thread winding portion configured to allow the dental floss to be wound therearound.

5. The dental floss holder according to claim 1, wherein one end portion of the dental floss is locked to the head portion, and the other end portion of the dental floss is adapted to be pinched by the user's fingers.

* * * * *